(12) United States Patent
Vähä-Sipilä et al.

(10) Patent No.: US 10,318,759 B2
(45) Date of Patent: Jun. 11, 2019

(54) METHOD AND APPARATUS FOR ENFORCING DATA PRIVACY

(71) Applicant: Nokia Technologies Oy, Espoo (FI)

(72) Inventors: Antti Oskari Vähä-Sipilä, Helsinki (FI); Henri Tapani Kujala, Helsinki (FI); Mikko Antero Niva, Helsinki (FI); Ian Justin Oliver, Söderkulla (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/450,862

(22) Filed: Mar. 6, 2017

(65) Prior Publication Data

US 2017/0243026 A1 Aug. 24, 2017

Related U.S. Application Data

(63) Continuation of application No. 13/071,209, filed on Mar. 24, 2011, now abandoned.

(60) Provisional application No. 61/447,206, filed on Feb. 28, 2011.

(51) Int. Cl.
*H04L 29/06* (2006.01)
*G06F 21/62* (2013.01)
*G06F 21/53* (2013.01)

(52) U.S. Cl.
CPC .......... *G06F 21/6245* (2013.01); *G06F 21/53* (2013.01); *G06F 21/6281* (2013.01); *H04L 63/102* (2013.01); *H04L 63/107* (2013.01); *H04L 63/20* (2013.01); *G06F 2221/2111* (2013.01)

(58) Field of Classification Search
CPC ....... H04L 63/20; H04L 63/102; H04L 63/10; G06F 21/6218
See application file for complete search history.

(56) References Cited

U.S. PATENT DOCUMENTS 6,275,824 B1 * 8/2001 O'Flaherty ......... G06F 21/6227
6,886,101 B2 * 4/2005 Glazer .................. G06F 21/604
707/999.009

(Continued)

FOREIGN PATENT DOCUMENTS

EP 2567326 A2 3/2013
GB 2422453 A 7/2006

(Continued)

OTHER PUBLICATIONS

Office Action for corresponding European Patent Application No. 12752381.9-1870, dated Apr. 13, 2017, 7 pages.

(Continued)

*Primary Examiner* — Khoi V Le
(74) *Attorney, Agent, or Firm* — Ditthavong & Steiner, P.C.

(57) ABSTRACT

An approach for maintaining user privacy information is described. A privacy management platform determines a request, from one or more applications, for access to local data associated with a device. The platform then determines and processes one or more privacy profile objects associated with the local data to determine one or more privacy policies associated with the local data, the device, or a combination thereof. Enforcement of the one or more privacy policies is then caused for granting access to the local data.

20 Claims, 11 Drawing Sheets

(56) References Cited

U.S. PATENT DOCUMENTS

| | | | |
|---|---|---|---|
| 7,042,988 B2* | 5/2006 | Juitt | H04L 1/22 |
| | | | 370/329 |
| 7,315,899 B2 | 1/2008 | Dunning et al. | |
| 7,346,585 B1* | 3/2008 | Alabraba | G06Q 10/00 |
| | | | 380/200 |
| 7,797,725 B2* | 9/2010 | Lunt | G06F 21/6254 |
| | | | 707/602 |
| 8,544,103 B2 | 9/2013 | Nilsson | |
| 2003/0023866 A1 | 1/2003 | Hinchliffe et al. | |
| 2003/0149781 A1 | 8/2003 | Pared et al. | |
| 2003/0159090 A1 | 8/2003 | Wray et al. | |
| 2004/0088579 A1* | 5/2004 | Powers | G06Q 50/24 |
| | | | 726/4 |
| 2005/0251865 A1* | 11/2005 | Mont | G06F 21/6245 |
| | | | 726/26 |
| 2006/0234678 A1* | 10/2006 | Juitt | H04L 1/22 |
| | | | 455/411 |
| 2006/0246920 A1* | 11/2006 | Shim | H04L 63/102 |
| | | | 455/456.2 |
| 2007/0130082 A1* | 6/2007 | Coley | G06F 21/10 |
| | | | 705/59 |
| 2008/0168548 A1* | 7/2008 | O'Brien | G06F 21/335 |
| | | | 726/9 |
| 2008/0301760 A1* | 12/2008 | Lim | H04L 63/20 |
| | | | 726/1 |
| 2009/0058822 A1* | 3/2009 | Chaudhri | G06F 3/04883 |
| | | | 345/173 |
| 2009/0320089 A1* | 12/2009 | Lyons | G06F 21/57 |
| | | | 726/1 |
| 2009/0328135 A1* | 12/2009 | Szabo | G06F 21/10 |
| | | | 726/1 |
| 2010/0107258 A1* | 4/2010 | Park | G06F 21/10 |
| | | | 726/26 |
| 2010/0233996 A1* | 9/2010 | Herz | H04L 63/08 |
| | | | 455/411 |
| 2010/0319051 A1* | 12/2010 | Bafna | G06F 21/6218 |
| | | | 726/1 |
| 2011/0227857 A1* | 9/2011 | Chaudhri | G06F 3/04883 |
| | | | 345/173 |
| 2014/0045524 A1 | 2/2014 | Nilsson | |

FOREIGN PATENT DOCUMENTS

| | | |
|---|---|---|
| JP | 2008538879 A | 11/2008 |
| KR | 20060113240 A | 11/2006 |
| WO | 03/045099 A1 | 5/2003 |
| WO | 03045099 A1 | 5/2003 |
| WO | 2004/075594 A1 | 9/2004 |
| WO | 2009155681 A1 | 12/2009 |
| WO | 2011139896 A2 | 11/2011 |

OTHER PUBLICATIONS

Office Action for corresponding Korean Patent Application No. 2013-7025470, dated May 25, 2016, with English-language summary, 12 Pages.

Office Action for corresponding Japanese Patent Application No. 2013-554923, dated Jun. 7, 2016, with English-language summary, 17 Pages.

Office Action for corresponding Korean Patent Application No. 10-2013-7025470, dated Jul. 31, 2015, with English-language summary, 8 Pages.

Office Action for corresponding Japanese Patent Application No. 2013-554923, dated Oct. 20, 2015, with English-language summary, 9 Pages.

Uematsu et al., "User Oriented and Policy Based Method of Privacy Protection Applied to JAVA Programs in Mobile Terminals", Multimedia, Distributed, Cooperative and Mobile Symposium, Japan, Information Processing Society of Japan, Jun. 4, 2003, pp. 553-556.

Babaguchi, "Visual Privacy Sensitive Information and Its Processing", Systems, Control and Information, Japan, Institute of Systems, Control and Information Engineers, vol. 54, No. 6, Jun. 15, 2010, pp. 242-247.

Office Action for corresponding Japanese Patent Application No. 2013-554923, dated Jan. 29, 2015, with English-language summary, 4 Pages.

Office Action for corresponding Korean Patent Application No. 10-2013-7025470, dated Jan. 29, 2015, with English-language summary, 6 Pages.

Office Action for corresponding Japanese Patent Application No. 2013-554923, dated Jul. 17, 2014, 10 Pages.

International Search Report for corresponding International Application No. PCT/FI2012/050168, dated May 24, 2012, pp. 1-4.

International Written Opinion for corresponding International Application No. PCT/FI2012/050168, dated May 24, 2012, pp. 1-7.

"Obtaining User Location", Android Developers, Sep. 16, 2011. (http://developerandroid.com/guide/topics/location/obtaining-user-location.html).

Office Action for related European Patent Application No. 12 752 381.9-1218, dated Feb. 21, 2019, 4 pages.

* cited by examiner

300

400

METHOD AND APPARATUS FOR ENFORCING DATA PRIVACY

RELATED APPLICATIONS

This application is a Continuation application of U.S. application Ser. No. 13/071,209, filed on Mar. 24, 2011, which claims the benefit of the earlier filing date under 35 U.S.C. § 119(e) of U.S. Provisional Application Ser. No. 61/447,206 filed Feb. 28, 2011, entitled "Method and Apparatus for Enforcing Data Privacy," the entirety of which is incorporated herein by reference.

BACKGROUND

Service providers and device manufacturers (e.g., wireless, cellular, etc.) are continually challenged to deliver value and convenience to consumers by, for example, providing compelling network services. One area of interest has been in securing the privacy of device users as they engage with other users or conduct various transactions via a communication network by way of sensor based applications. For example, many devices are equipped with various sensors including cameras, microphones, positioning systems, gyroscopes and the like that enable them to detect the device location and position, acquire images and sound and other contextual data. Hence, when a user of a device executes a navigation tool (e.g., route finder), video conferencing service or other sensor based application, the application relies upon the sensors to obtain the necessary location information, time information, etc. Unfortunately, this data may also reveal personal information about the user that could compromise their privacy or jeopardize their anonymity.

SOME EXAMPLE EMBODIMENTS

Therefore, there is a need for an approach to maintaining user privacy information.

According to one embodiment, a method comprises determining a request, from one or more applications, for access to local data associated with a device. The method also comprises determining one or more privacy profile objects associated with the local data, the device, or a combination thereof. The method further comprises causing, at least in part, enforcement of the one or more privacy policies for granting the access to the local data. Still further, the method comprises processing and/or facilitating a processing of the one or more privacy profile objects to determine one or more privacy policies associated with the local data, the device, or a combination thereof.

According to another embodiment, an apparatus comprises at least one processor, and at least one memory including computer program code, the at least one memory and the computer program code configured to, with the at least one processor, cause, at least in part, the apparatus to determine a request, from one or more applications, for access to local data associated with a device. The apparatus is also caused to determine one or more privacy profile objects associated with the local data, the device, or a combination thereof. The apparatus is further caused to cause, at least in part, enforcement of the one or more privacy policies for granting the access to the local data. Still further the apparatus is also caused to process and/or facilitate a processing of the one or more privacy profile objects to determine one or more privacy policies associated with the local data, the device, or a combination thereof.

According to another embodiment, a computer-readable storage medium carries one or more sequences of one or more instructions which, when executed by one or more processors, cause, at least in part, an apparatus to determine a request, from one or more applications, for access to local data associated with a device. The apparatus is also caused to determine one or more privacy profile objects associated with the local data, the device, or a combination thereof. The apparatus is further caused to process and/or facilitate a processing of the one or more privacy profile objects to determine one or more privacy policies associated with the local data, the device, or a combination thereof. Still further the apparatus is further caused to process and/or facilitate a processing of the one or more privacy profile objects to determine one or more privacy policies associated with the local data, the device, or a combination thereof.

According to another embodiment, an apparatus comprises means for determining a request, from one or more applications, for access to local data associated with a device. The apparatus also comprises means for determining one or more privacy profile objects associated with the local data, the device, or a combination thereof. The apparatus further comprises means for processing and/or facilitating a processing of the one or more privacy profile objects to determine one or more privacy policies associated with the local data, the device, or a combination thereof. Still further, the apparatus further comprises means for causing, at least in part, enforcement of the one or more privacy policies for granting the access to the local data.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-30, and 46-48.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term application programming interface (API) refers to a particular set of rules and specifications that a calling software application can follow to access and make use of the services and resources provided by the application, device, operating system, etc. Although various embodiments are described with respect to application programming interfaces (APIs), it is contemplated that the approach described herein may be used with other protocols, instruction sets, rule bases, definitions, functions, libraries, object classes, data structures, procedure calls, web services and the like.

Figure 1:
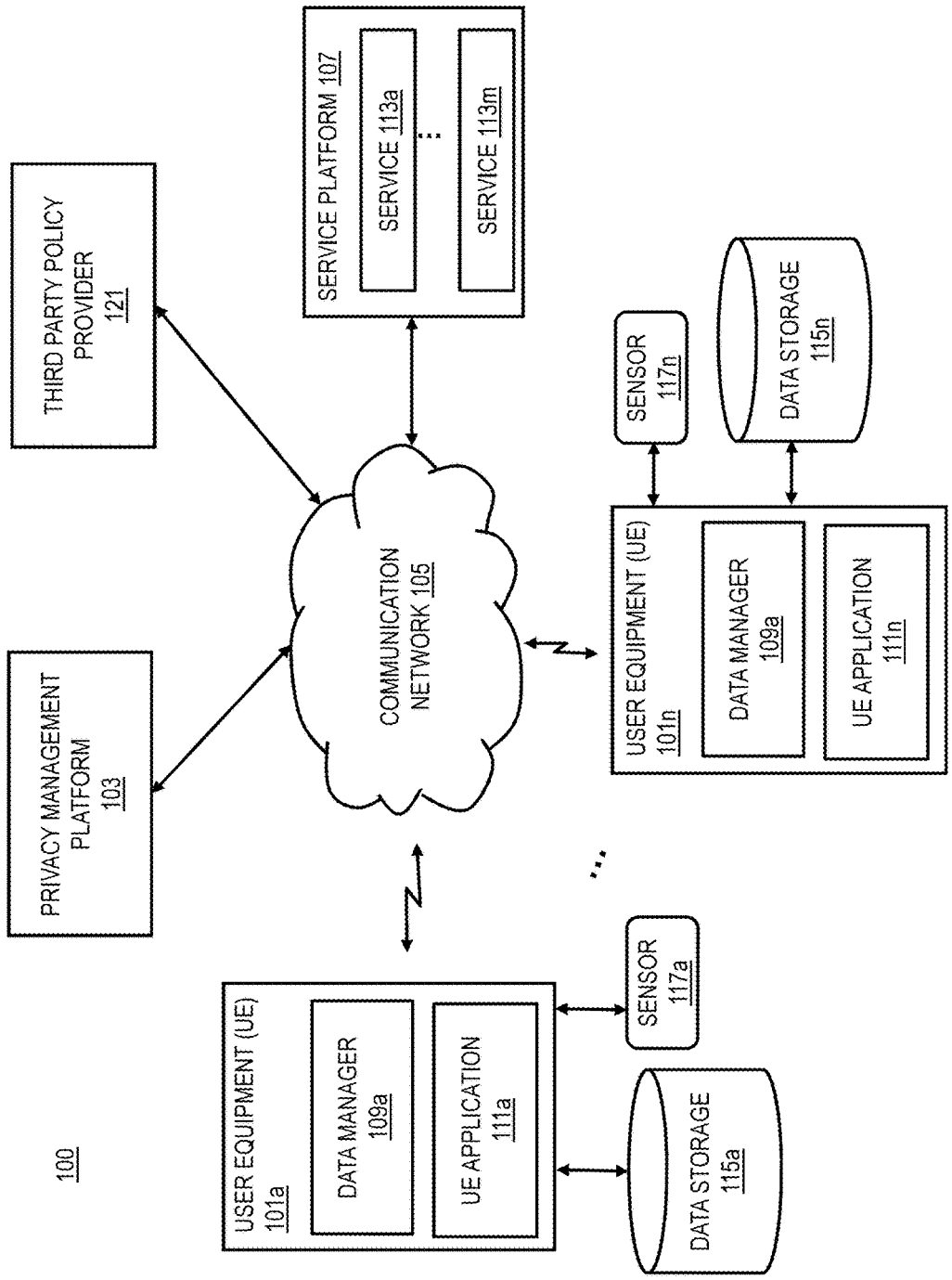
FIG. 1 is a diagram of a system capable of maintaining user privacy information, according to one embodiment.

FIG. 1 is a diagram of a system capable of maintaining user privacy information, according to one embodiment. The system is configured to enable the execution of privacy policies based on the processing of one or more privacy profile objects, including those provided by a trusted external source. As such, the privacy of local data regarding the device or user thereof is maintained. As used herein, a "privacy policy" is a set of rules and/or equations that are employed for governing the execution of a system, including hardware, software, firmware or a combination thereof. By way of example, a policy may indicate a procedure to be executed by a user device in response to the sharing of information, a regulation to be enacted in response to a request for usage of one or more sensors 117 of the user device, or any other task to be performed based on the determination of some predetermined criteria.

In addition, privacy policies may be specific to the application, a group of applications, the service, a group of services, a device, a user, a system, or a combination thereof. As one example, one privacy policy may be specific to one software application, while another privacy policy may be specific to another software application. As another example, a privacy policy may be specific to a group of services that are considered as advertising services. Also, as another example, there may be a privacy policy specific to a device with a GPS device and another privacy policy specific to a device without the GPS device such that the privacy policy may be different depending on the capability of the device.

Also, as used herein, "local data" pertains to any information that can be retrieved or acquired by a device regarding the user, the device, or other devices, the environment of the user, the device or of other devices, an activity pertaining to the user, the device, or the other devices, or a combination thereof. For the purpose of example, the local data includes, at least in part, data detected by one or more sensors associated with the user device. The local data may also pertain to data stored at the device that pertains to the user, including user profile information, digital media in a user device, user calendar information, context information of the user, etc.

Typically, many portable devices including cell phones, Smartphones and the like are equipped with various sensors including cameras, microphones, positioning systems, gyroscopes and accelerometers for enabling them to detect information pertaining to location, position, movement and speed, as well as acquire images, sound and other contextual data. Device applications and services such as navigation services (e.g., global positioning system (GPS) software), video conferencing services and other sensor based applications rely upon the sensors to obtain the necessary input data (e.g., local data such as location information, position information and speed information) they require to perform application tasks. Typically, the applications access the sensors by way of calling upon them, such as through execution of an API, feature access policy or other means. However, there are drawbacks to such access and control mechanisms, including:

Typical applications require their own application programming interface (API) where access to these APIs is governed by a platform security framework of the device. While platform security makes an access control decision of whether a specific application gets access to an API or not, the decision is binary and does not account for varying degrees of access. Users are not allowed to change application-specific preferences for regulating such access.

As each service is provided by a different API, there is not currently a central place that would govern the privacy preferences on the device locally. Likewise, third party applications do not have a central place where they can obtain privacy preferences information.

User settings related to privacy are potentially problematic in terms of user experience.

This is because the users may not be aware of differences between applications (for example, several applications doing the same thing), plug-in architectures between applications (the privacy preferences of a plug-in would actually be preferences for the host applications) and different types of prompts and indications by different, potentially third party applications.

Unfortunately, these factors in combination or in part contribute to the fact that services and applications of a user device reliant upon the sensory mechanisms of the system may also reveal personal information about the user that could compromise their privacy or jeopardize their anonymity.

To address this problem, a system 100 of FIG. 1 introduces the capability to maintain and enforce privacy policy settings. According to one embodiment, the system 100 determines to act on a request, from an application 111 or a service, for data associated with a device and/or a user of the device. For example, an application 111 or a service may request to retrieve data maintained in data storage 115 as associated with a device and/or a user of the device, such that this data may be shared with the application or the device. The data may include various types of data including a user profile information, digital media in a user device, user calendar information, context information of the user, etc. Also, the application 111 or service may request to acquire data associated with a device and/or user of the device by way of one or more sensors 117 of the device. Whether acquired from storage 115 or by way of one or more sensors 117, this data comprises local data.

System 100 is also configured to determine and subsequently process one or more privacy policy objects that are associated with the acquired local data, the device, or a combination thereof. As used herein, a "privacy policy object" pertains to any set of instructions, resources, rules or data that is related to, or required for, the enforcement of one or more privacy policies to be executed respective to the requesting application 111 or service. The privacy policy objects are remotely programmable and/or retrievable from a trusted external/third party policy provider 121. In certain embodiments, the privacy policy objects, referred to at times herein as "objects," may be computer, machine for software executable interface code, user interface media resources, privacy policy implementation code, or a combination thereof. Hence, an object may be downloaded from the third party policy provider 121, such as to facilitate execution of the data request by an application 111 or service. In other instances, the objects may be retrieved independent of the requesting application 111. Once retrieved, the object(s) may then be installed, such that execution of the object(s) in relation to the requesting application affects the behavior of the device.

In certain embodiments, objects are downloaded and installed to the user device by the privacy management platform 10. Responsive to processing or execution of the one or more privacy profile objects, the device is caused to enforce one or more privacy policies for granting the requesting application access to the local data. The system 100 enables various enforcement mechanisms to be employed, based at least in part on the particular object, policy to be enforced, and other factors. This may include causing presentation of an indicator to the user interface, the indicator being representative of the privacy policy object, generating a prompt requesting an approval from a user of the device for a granting of access to the local data, generating an alert regarding the request, applying one or more transformations to the local data so that it is accessed in its transformed state, or denying access to the local data or a portion thereof.

The transformation applied to the local data by system 100 may be executed by way of one or more equations or transformation rules, such that the means of presentment of data or acquisition of data is affected. By way of example, the data may be transformed such data is presented according to granularity level for the data, i.e., as based on at least one privacy policy. The granularity level may represent a level of details or a hierarchy of information. Also, the granularity level may be related to specific types of information. The privacy policy may provide a mechanism as to how the granularity level is to be determined—e.g., based on a security level—for affecting how the local data is processed or acquired. In a sample use case, if the information to be revealed is location information of the user device and a policy is enforced for limiting the extent of detail of information presented; a transformation based on granularity level may affect how the location information is revealed. Accessing of the user device's location information, or executing a location sensor (e.g., GPS sensor) of the device, may depend on the specific privacy profile objects associated with the device, data, etc. For example, granularity levels for a navigation application, a geotagging application and a location-based advertisement application may be high, medium and low, respectively.

As shown in FIG. 1, the system 100 comprises user equipment (UEs) 101a-101n (also collectively referred to as UEs or UE 101) having connectivity to a privacy management platform 103 via a communication network 105. The UE 101 and the privacy management platform 103 may also have connectivity to the service platform 107. The service platform may provide various services to the user device, including information processing services, data retrieval services and the like. By way of example, the service may be in the form of an executable web service or network application, which may be executed independently of or in connection with an application 111 of the UE 101. The UE 101 may also include a data manager 109 (e.g., respective data managers 109a-101n of the UEs 101a-101n) that communicate with the privacy management platform 103 to determine accessibility of the data related to the UE 101 and/or the user of the UE 101. In certain embodiments, the privacy management platform 103 is further configured to find, retrieve and install objects as provided by a trusted third party or external policy provider to the UE 101 for facilitating policy management. It is noted that in certain instances, the service platform 107 and third party policy provider 121 may be integrated. Also, the privacy management platform 103 may exist independently, or within the UE 101, or within the service platform 107.

The privacy management platform 103 may be used to manage data upon a request for the data from an application or a service. The application may be a UE application 111 (e.g., UE applications 111a-111n), which may include various types of software application in the UE 101. By way of example, if the user device is the UE 101a, the application that requests for the data may be the UE application 111a or an application of another device such as the UE application 111n of the UE 101n. The service that requests for the data may include at least one of the services 113a-113m in the service platform 107, which are accessible via the communication network 105.

The requested data may include context data, user identity data, user profile data, or a combination thereof. The context data may include location information, and the granularity level may determine the detail level, the exactness, or a combination thereof of the location information in the transformed data. Thus, the context data may be acquired via the sensor 117 (e.g., sensors 117a-117n of UEs 101a-101n), which may include a location sensor. Further, the UE 101 may be connected to a sensor 117, which is used to collect various types of sensor data. The sensor may include a location sensor such as a global positioning system (GPS) device, a sound sensor, a speed sensor, a brightness sensor, etc. The UE 101 may also be connected to a data storage medium 115 (e.g., data storage media 115a-115n) to store various types of data. The sensor data may be stored at the data storage medium 115 after being collected by the sensor 117.

In one embodiment, the system 100 determines an intended use of the data by the application or the service based on the privacy policy settings, objects associated therewith, local data or a combination thereof. For example, if the request for local data is to provide information in relation to an advertisement service (e.g., a cookie or tracking code), the system 100 may provide a low granularity level and provide less detail of the data or even restrict access to the local data. This is because the advertising service may be considered a stranger or an unknown service that the user does not feel comfortable sharing much of their information about; thus policy settings for this service would enforce lower granularity (e.g., local data transformation), restricted access, an error code, a message prompting the user or an indicator.

In one embodiment, the system 100 may associate the transformed data with the content associated with the application and/or the service. For example, the system 100 may associate the transformed data about a user's location with an advertising service such that the advertising service may provide the user with advertisements based on the transformed data on the location. Hence, the content would be catered to the level of granularity. As another example, the system 100 may associate the transformed data about a user's location with a geotagging application, such that the geotagging application may utilize the transformed data to find a tagged location. In addition, one or more indicators may be rendered to the user interface of UE 101 in response to the attempted access of local data by the geotagging application, such as an icon, a sound, haptic feedback, a change in color of an icon, etc.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UE 101, the privacy management platform 103, the service platform 107 and third party policy provider communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
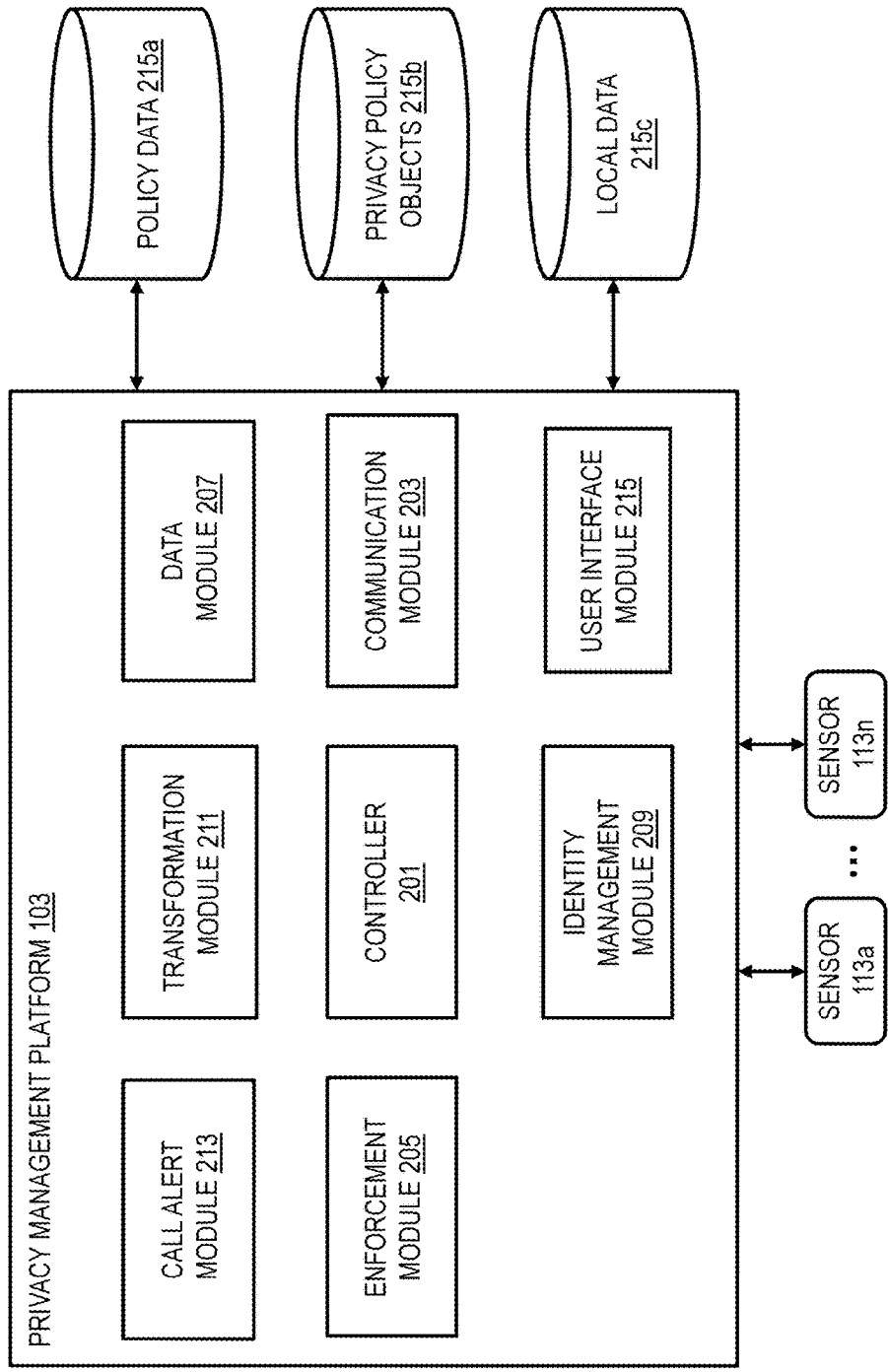
FIG. 2 is a diagram of the components of privacy platform for maintaining user privacy information, according to one embodiment.

FIG. 2 is a diagram of the components of privacy management platform for maintaining user privacy information, according to one embodiment. It is contemplated that the functions of these components may be combined in one or more components or performed by other components of equivalent functionality. In this embodiment, the privacy management platform 103 includes a controller 201, a communication module 203, an enforcement module 205, a data module 207, an identity management module 209, a transformation module 211, a call alert module 213 and a user interface module 215. The controller 201 oversees tasks performed by the various other modules. In addition, the privacy management platform 103 also accesses privacy policy data, privacy policy object data and local data from databases 115a-115c respectively.

As mentioned, policy data 115a indicates specific privacy policy settings and what data is eligible for return in response to a request for local data by a particular application of the device (e.g., an API call). The local database 115c may contain various local data, including that acquired by the device or that available for acquisition and storage to the database by way of one or more sensors 113a-113n. In addition, the privacy policy object database 115b may store the various objects as acquired via the data module 207 from a third party policy service provider 121. As mentioned previously, the objects may be associated with specific policies maintained in the policy database 115a. The data defines various instructions for enabling visual, audible or other indicators to be executed by a device in response to a policy setting. By way of example, the policy execution rules 115 may designate or supply the graphic data, sound data, interface media resources, user interface code (like JavaScript or Qt Meta-Object Language (QML)), or a combination thereof required to implement a specific indicator at the user device.

It is noted, therefore, that the policy data 115a is associated with requisite data and/or instructions (e.g., privacy policy objects data 115b) for affecting operation of the device (playing of a sound, presentment of an icon, etc.), responsive to a request for local data 115c by an application.

In one embodiment, the call alert module 213 receives notice of a request for local data (e.g., an API call) by a specific application. The application may be an application (e.g., UE application 111) in the user device (e.g., UE 101) or another device. The service may be any type of service, including social networking services, digital media services, etc. The requested data may include context data, user identity data, user profile data, etc. The requested data may also include media data in the user device. The context data may include location information, sensor data, user calendar data, time, weather, etc. The location information may also be the sensor data that is obtained via a location sensor such as the GPS device. Upon determining a request/call attempt, the call alert module 213 notifies a data module 207 of the request. In certain embodiments, the call alert module 213 is triggered when an application 111 or service attempts to access a sensor 113a-113n for further determining or generating local data 115c.

The data module 207 retrieves data from the policy database 115a to determine a specified privacy setting or action to be taken. In addition, the data module 207 determines one or more privacy policy objects from the object database 115b that are to be associated with the local data 115c. It is noted also that the data module 207 also manages various types of data, as maintained in the various databases 115a-115c, and also is capable of determining elements within a data. Based on the determined privacy action, the data module 207 alerts the enforcement module 205, which further initiates execution of the various other modules (e.g., communication module 203 or transformation module 211) with respect to a request for local data. Initiation of the action associated with the policy data 115a, policy objects 115b or local data 115c is performed in connection with an enforcement module 205.

In one embodiment, the communication module 203 manages communication of data among the UE 101, the privacy management platform 103, the service platform 107 and the third party policy provider 121. The communication module 203 also manages communication of signals (e.g., a request, a command) that are communicated among the UE 101, the privacy management platform 103, the service platform 107 and third party policy provider 121.

The communication module 203 may also be configured to generate a prompt of notification to the user regarding the specific privacy policy data 115a, local data 115c or a combination thereof. For example, the communication module 203 may process or facilitate processing of the one or more policy objects 115b to cause the UE 101 to generate an on screen message, play an audio cue, display an icon, adapt a color, hue or transparency of information presented to the display of UE 101, or any other prompt in response to the accessing of a sensor 113a-113n or local data 115c. Operating in connection with the enforcement module 205, the communication module can also be set to deny the release of local data altogether and request an error code be returned by the communication module 203

In certain embodiments, the transformation module 211 applies a transformation to the local data such as to decrease the level of accuracy of a location, replacing the data with some other data to preserve privacy, or adjust a granularity of the data. The transformation module 211 determines a transformation function to perform based on a type of the local data 215c, the associated policy objects 215b and the privacy policy settings data 215a. In one example, the privacy policy may be determined based on sensitivity and primary usage. The sensitivity classification for the privacy policy may determine whether the information should be included in the transformed data.

The transformation module 211 may also operate in connection with the communication module 203 to enable adjusting of how data is presented to the display with respect to a transformation, such as to make it less identifiable or associable with the user. This may include adjusting the granularity or level of detail of information.

In one embodiment, the data module 207 may associate the transformed data with content associated with the application and/or the service. For example, if the transformed data is related to location information of the user device, then an advertising service that initiates the request to the privacy management platform 103 may provide advertisement content for the location information, such that the advertisement content can be associated with the transformed data.

In one embodiment, the identity management module 209 determines and manages various identities including identities of users, identities of applications and application providers/venders as well as identities of the devices (e.g., UE 101). As such, the identity management module 209 determines identities of the applications, the services, devices, the users, the system, etc. such that appropriate privacy policy may be used depending on their identities. In addition, the identity management module can also keep tabs on which applications have requested privacy policy data 215a, and use that information for impacting the user experience. This may include executing, at the device in question, a sound to be played, icon to be generated, etc. per execution of the modules that perform these functions (e.g., communication module 203).

In one example, the privacy policy may be determined based on sensitivity and primary usage. The sensitivity classification for the privacy policy may determine whether the information should be included in the transformed data. In one example, the sensitivity may have three classifications—secret, private and public. The information under the secret classification may never be accessed or shared by other users and/or devices. The information under the private classification may be accessed only in certain conditions. The information under the public classification may always be accessed. Further, the primary usage may have three classifications—share, customer care, and advertising. The information under the share classification may used for sharing with other users, services, devices etc. The information under the customer care classification may be for customer care. The information under the advertising classification may be used for advertising purposes. The sensitivity classification and/or the primary usage classification may be used for different types of data.

As one example, the following tables, table 1 and 2, show four types of the data (media, event, personal, location) for the primary usage classification and the sensitivity classification. As these classifications are a part of the privacy policy, these classifications may be specific to the requesting user or application/service.

TABLE 1

| Primary Usage Classification | | | |
|---|---|---|---|
| | Share | Care | Advertising |
| Media | X | X | X |
| Event | X | | |
| Personal | | X | X |
| Location | X | X | |

TABLE 2

| Sensitivity Classification | | | |
|---|---|---|---|
| | Secret | Private | Public |
| Media | | | X |
| Event | | X | |
| Personal | X | | |
| Location | | X | |

Table 1 indicates that the media data may be shared, may be used for the customer care, and may be used for advertising. Table 1 also indicates that the event data may be used only for sharing, and the personal data may be used only for the customer care and the advertising. Further, Table 1 shows that the location data may be used for sharing and for customer care. In addition, table 2 indicates that the media data may be available to the public, and the personal data is to be remained secret and not to be accessed by others, while the event data and the location data may be accessed by others under certain conditions. The transformation function may enforce either the sensitivity classification or the primary usage classification, or a combination thereof.

One example of the transformation function enforcing both the primary usage and the sensitivity may be enforcing a combination of table 1 and table 2 (e.g., table 1 ⊗ table 2). Then, the media data may be available to the public, and may be used for the sharing, the customer care and advertising. The event data may be used for sharing, and may also be accessed under certain conditions, but not for the customer care or the advertising. The personal data is consider secret, and thus cannot be accessed unless the personal data is used for the customer care or the advertising. The location information may be used for the sharing and the customer care, and may be accessed for certain conditions, but may not be used for the advertising.

As another example, the following table, table 3, shows an example where the primary usage classification has more details than the sensitivity classification of table 1.

TABLE 3

| Primary Usage Classification | | | |
|---|---|---|---|
| | Share | Care | Advertising |
| Media | No Change | No Change | No Change |
| Event | Filter | Block | Block |
| Personal | Block | Filter | Filter |
| Location | No Change | No Change | Block |

In this example, according to table 3, when the media and the location are shared, no change is applied to the media data and the location data, whereas the event data is changed before being shared based on a filter function defined for the user or application/service requesting the data. The personal data in this example is blocked from sharing. For a customer care, the media data and the location data may be accessed without any change, but the event data is blocked and the personal data is filtered. Also, for advertising, the media data may be accessed without any change, but the event data and the location data are blocked from the advertising service, and the personal data is filtered. Further, as discussed above, the transformation function may enforce both the primary usage and the sensitivity by enforcing a combination of table 3 and table 2 (e.g., table 3 ⊗ table 2).

Figure 3:
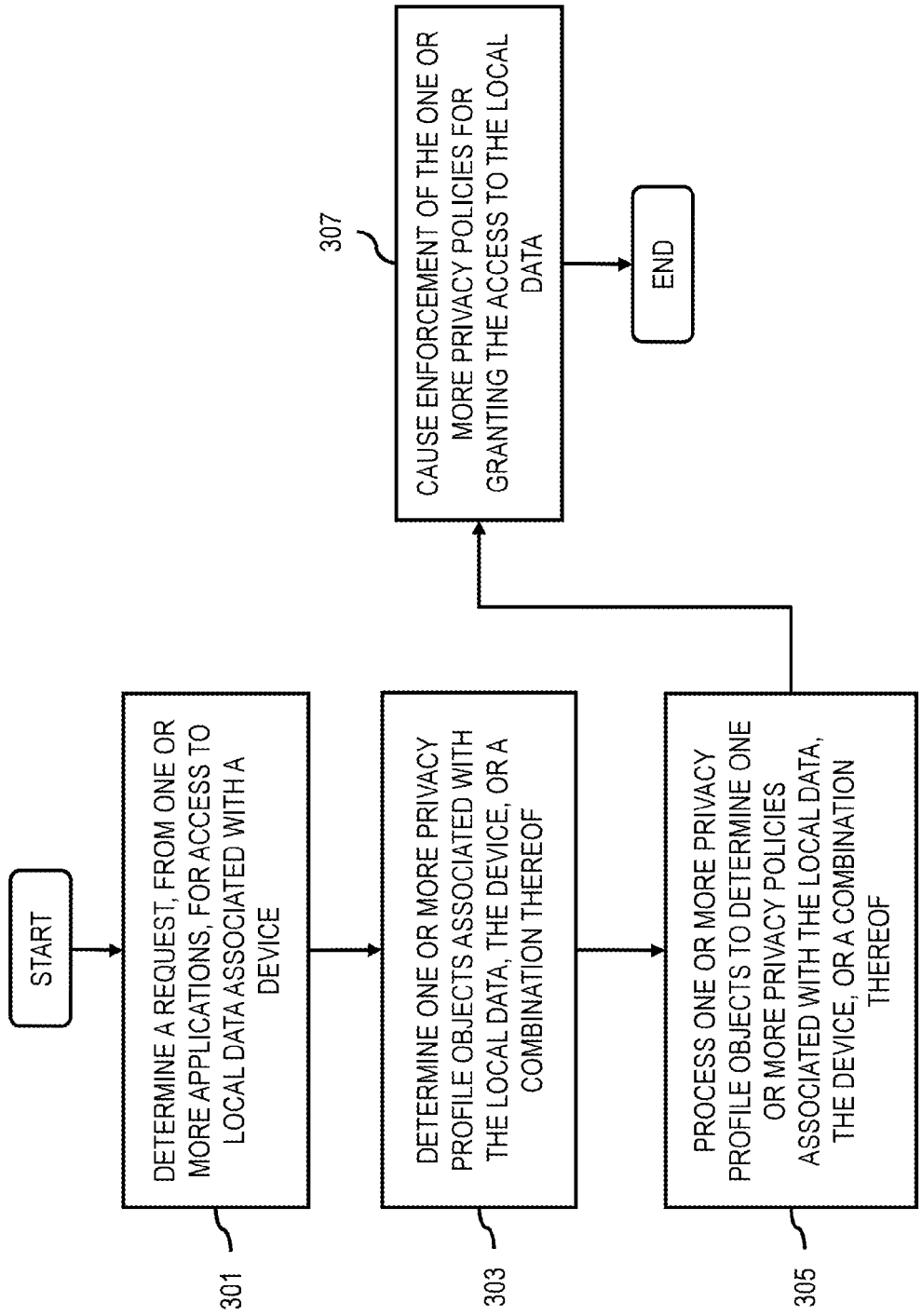
FIGS. 3-5 are flowcharts of processes for maintaining user privacy information, according to various embodiments.
Figure 4:
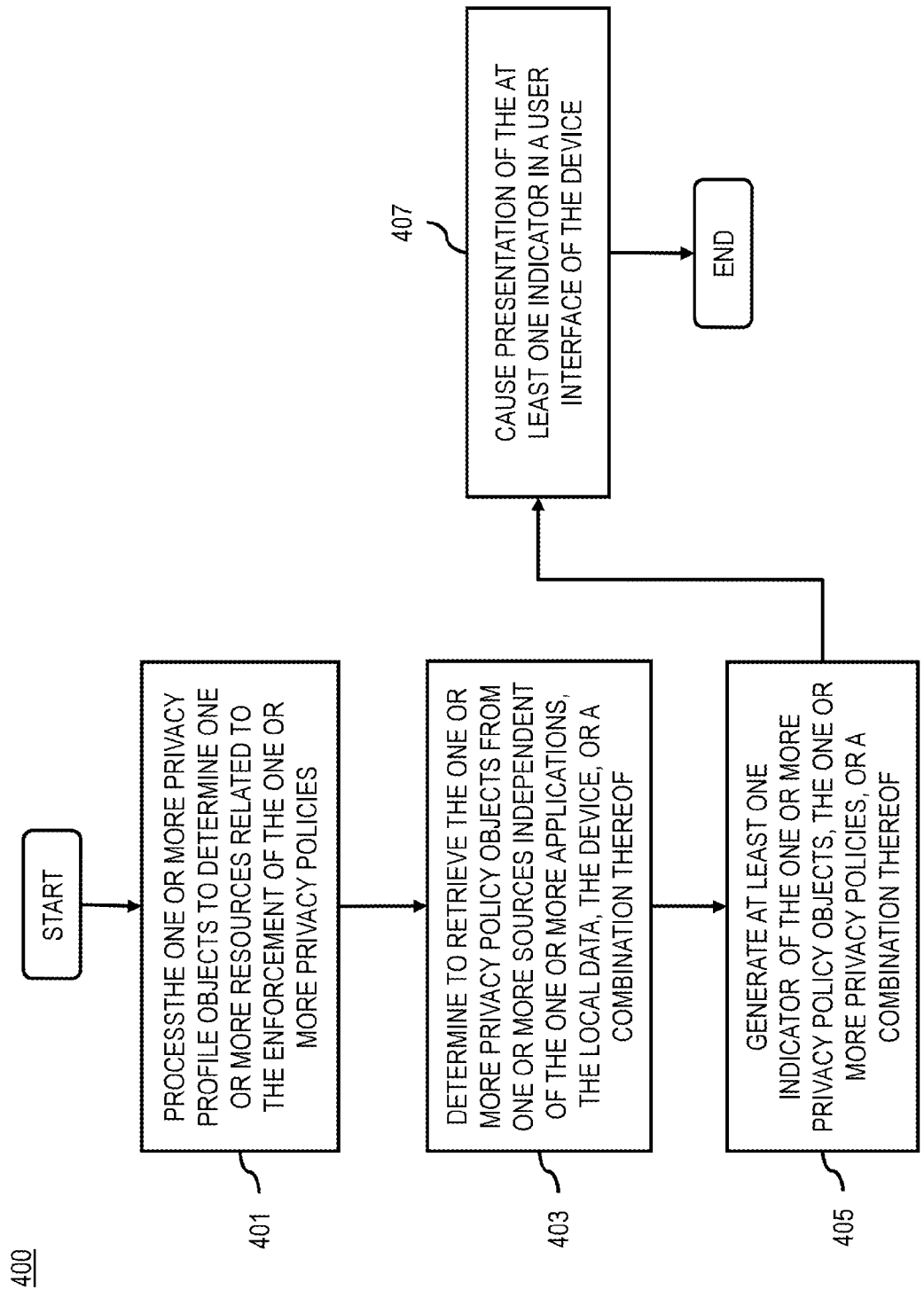
Figure 5:
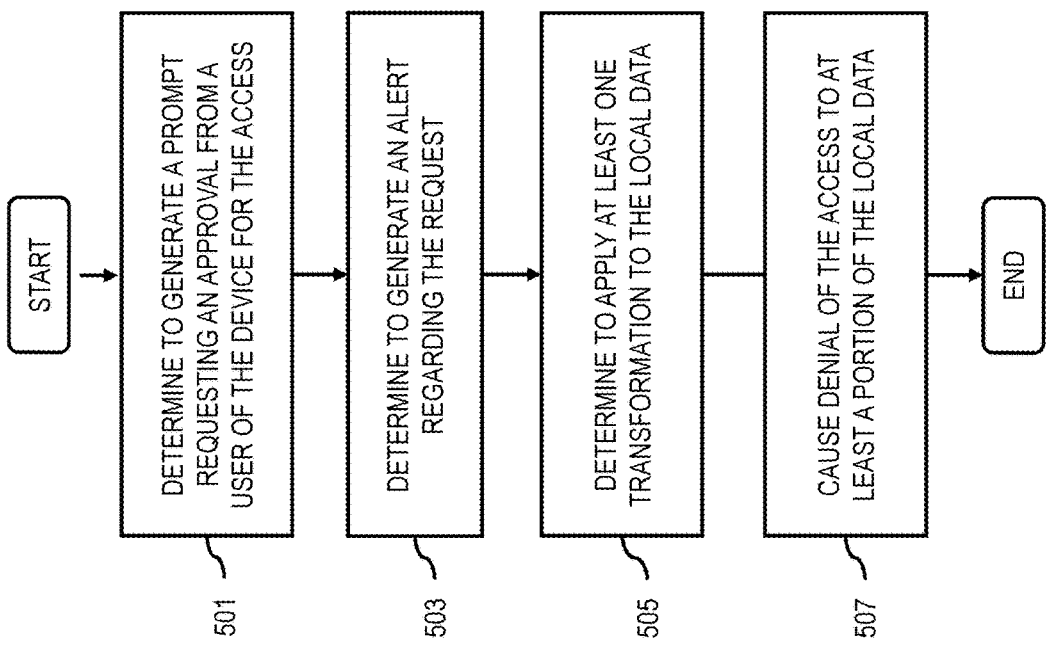
Figure 9:
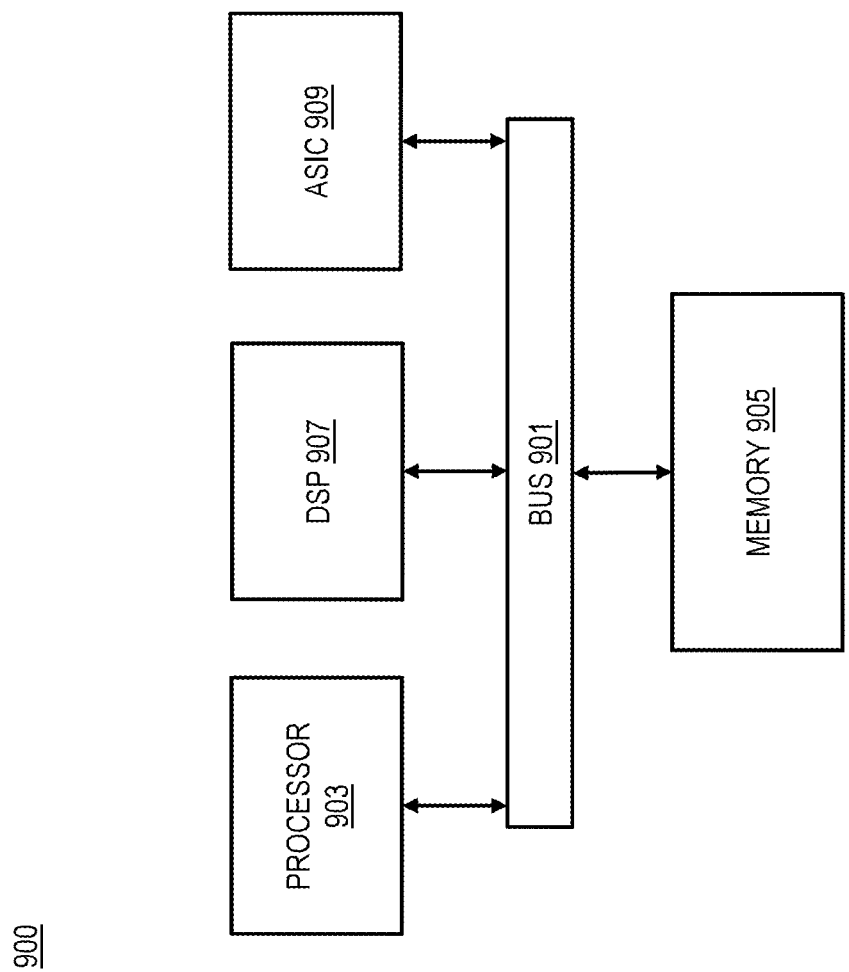
FIG. 9 is a diagram of a chip set that can be used to implement an embodiment of the invention.

FIGS. 3-5 are flowcharts of processes for maintaining user privacy information, according to various embodiments. In one embodiment, the privacy management platform 103 performs the processes and is implemented in, for instance, a chip set including a processor and a memory as shown in FIG. 9. For the purpose of illustration, the processes are described with respect to FIG. 1. It is noted that the steps of the process may be performed in any suitable order, as well as combined or separated in any suitable manner.

In step 301 of process 300, the privacy management platform 103 determines a request, from one or more applications, for access to local data associated with a device. As mentioned previously, the request may be initiated by an API that calls for access to the local data on behalf of one or more applications of services. It is noted that the request can be intercepted from a request directed to the source of the local data (e.g., a sensor 117 such as a location module). In another step 303, the privacy management platform 103 determines one or more privacy profile objects associated with the local data, the device, or a combination thereof. Of note, the privacy profile objects may be generated and made available for access by the privacy management platform 103 by way of a third party and/or external policy provider 121, such as a non-governmental organization, open source data or software supplier or software task force that sets software policy standards and guidelines.

Per step 305, the privacy management platform 103 processes the one or more privacy profile objects to determine one or more privacy policies associated with the local data, the device, or a combination thereof. In another step 307, the privacy management platform 103 causes enforcement of the one or more privacy policies for granting the access to the local data.

In step 401 of process 400 (FIG. 4), the privacy management platform 103 processes one or more privacy profile objects to determine one or more resources related to the enforcement of the one or more privacy policies. By way of example, the one or more resources may include user interface code, user interface media resources, privacy policy implementation code, or a combination thereof. Of noted, the interface code, interface media resource, privacy policy implementation code, etc. may be processed at the device to facilitate enforcement of the one or more privacy policies.

In step 403, the privacy management platform 103 determines to retrieve one or more privacy policy objects from one or more sources independent of the one or more applications, the local data, the device, or a combination thereof. By way of example, the objects may be downloaded and installed without initiation of a request by a calling application or service. Rather, it may be prompted by a user or the device in response to an initial device configuration, network or business security profile establishment, or the like. For the purpose of illustration, this separation is indicated with respect to FIG. 2, which depicts interdependent databases 115*a*-115*c* for maintaining various types of data.

Per step 405, the privacy management platform 103 generates at least one indicator of the one or more privacy policy objects, the one or more privacy policies, or a combination thereof. The indicator may include an icon, a sound, haptic feedback, a change in color of an icon, etc. Also, the privacy management platform 103 may be configured to determine at least one source f the local data such that the indicator is generated to represent that source. For example, if the local data source is a location sensor (e.g., GPS sensor), then an icon representative of this source is presented to the device. In another step 407, the platform 103 also causes presentation of the at least one indicator in a user interface of the device. It is noted that presentation of the at least one indicator is not limited to visual presentation to a display, but also includes the execution of a sound, activation of a light (e.g., flickering), performance of a vibratory movement of the device, or the like.

In further embodiments, it is contemplated that the indicator may be caused to be directed to other devices associated with the device running the application or service. For example, the indicator may be caused to be presented to a nearby laptop being operated by the user in the case of the user not readily observing a mobile device from which the request was initiated.

In FIG. 5, per steps 501-507 of process 500, the privacy management platform 103 determines to perform various actions responsive to the determined object. These may include determining to generate a prompt requesting an approval from a user of the device for the access, wherein the granting of the access is based, at least in part, on the approval (step 501); determining to generate an alert regarding the request (step 503); determining to apply at least one transformation to the local data, wherein the access is granted to the transformed local data (step 505); and causing, at least in part, denial of the access to at least a portion of the local data (step 507). It is noted that the local data includes, at least in part, sensor data associated with the device.

FIGS. 6A-6G are diagrams of user interfaces utilized in the processes of FIGS. 3-5, according to various embodiments. By way of example, the diagrams pertain to interfaces for enabling a user to select an application or a service to be executed and further, the specific privacy settings associated with said application. With respect to FIG. 6A, a title section 601 shows that this user interface 600 is for selecting an application or a service. The list 603 shows a list of applications and services that can be selected to set privacy settings. In this case, the Map Application has been selected, as indicated by a gray shade. The OK button 605 may be pressed to proceed with the selection, and the options button 607 may be selected to show various options.

Figure 6A:
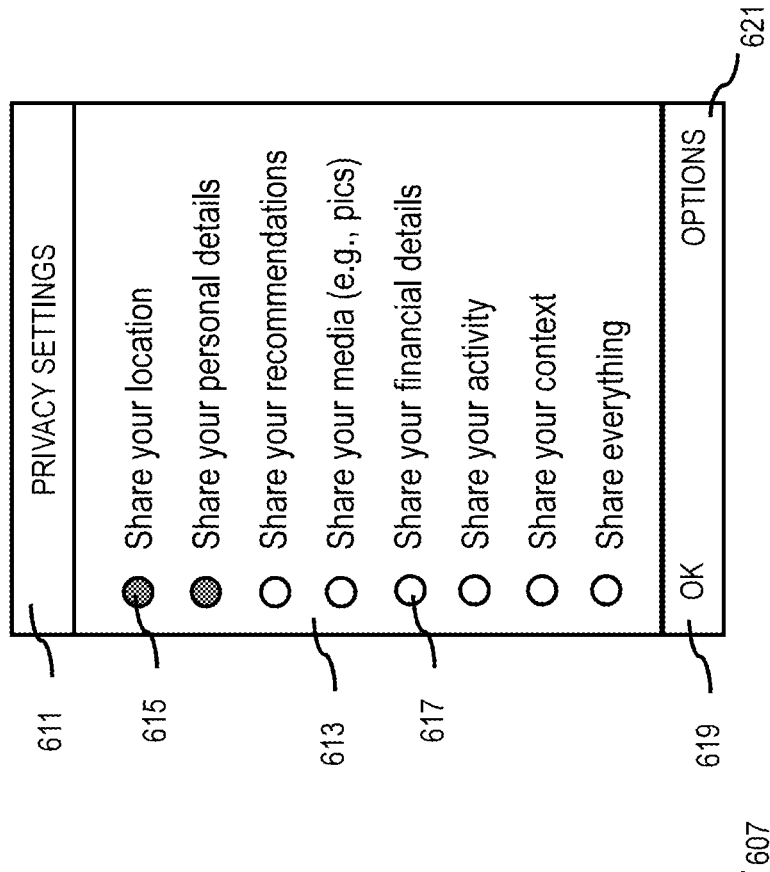
FIGS. 6A-6E, and 7A-7B are diagrams of user interfaces utilized in the processes of FIGS. 3-5, according to various embodiments.
Figure 6B:
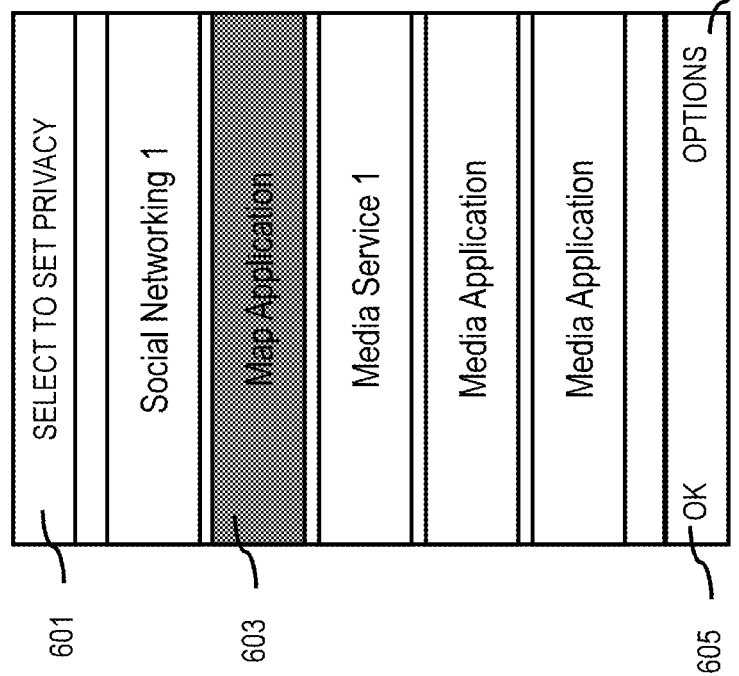

FIG. 6B shows a user interface 610 showing various privacy settings. This user interface 610 may be presented after the selection is made in the user interface 600 of FIG. 6A. The title section 611 shows that this user interface 610 is for setting privacy settings. The main screen 613 shows various privacy settings with selection buttons such as buttons 615 and 617. Button 615 is shaded in gray to indicate that the setting corresponding to this button 615 is selected. The OK button 619 may be pressed to proceed with the selection, and the options button 621 may be selected to show various options.

It is noted that the list of settings as presented may be one or more default settings or may vary by application. Still further, in certain embodiments, it is contemplated that the privacy settings options may be generated or updated by a trusted third party or external organization (e.g., a privacy non-governmental organization). In this case, the profile settings as shown by way of the interface for execution may be provided to the user device by the external organization as one or more privacy profile objects. The user may download and install these objects for enabling configuring of a specific profile setting (e.g., on a per application basis), thus supporting centralized policy establishment and preventing a user from having to understand specific privacy settings.

Figure 6C:
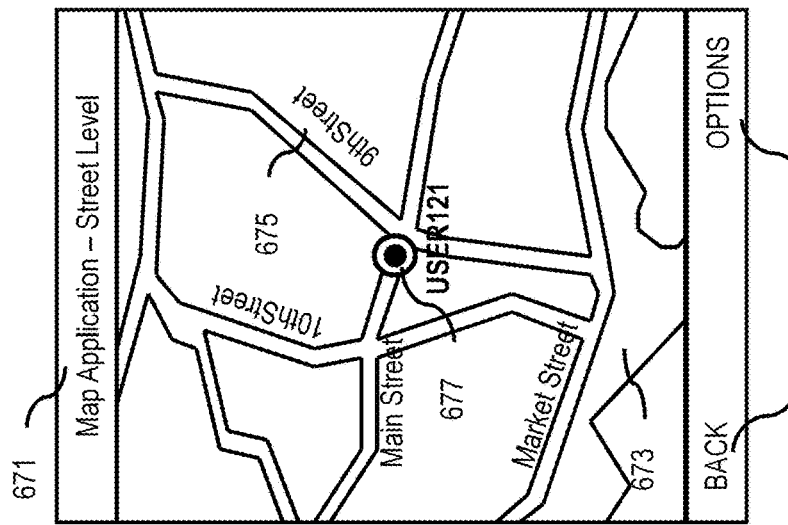
Figure 6D:
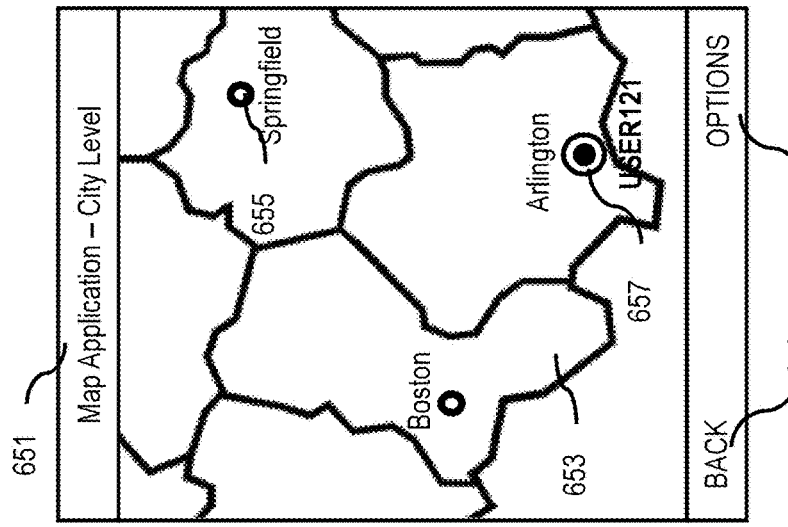
Figure 6E:
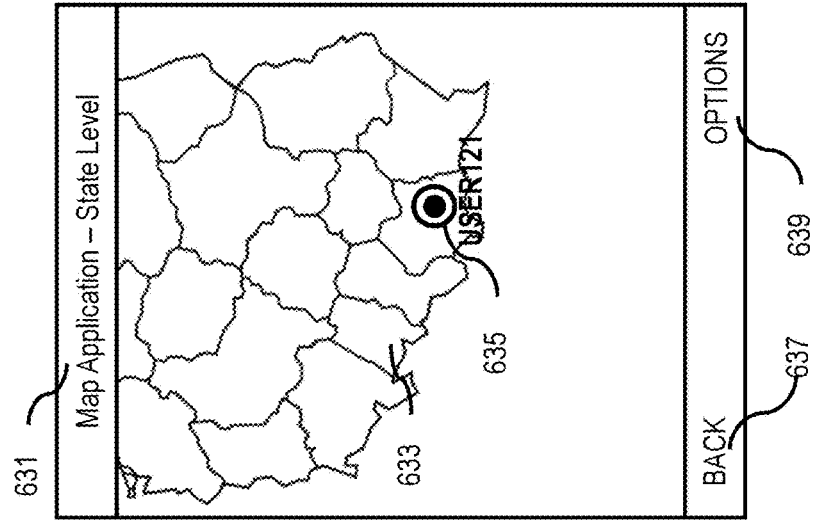

FIGS. 6C-6E are diagrams of user interfaces by a requester that requests the user to share location information of the user. FIG. 6C shows a user interface 630 for a requester with a low granularity level. The title section 631 shows that the user interface 630 is for a map application. The title section 631 also shows the map application from a state level perspective; thus the map 633 shows states in a zoomed-out map view. The user location indicator 635 shows which state the user is located on the map 633. The user location indicator 635 also shows the user identifier as USER121. A back button 637 goes back to a previous user interface, and the options button 639 may be selected to show various options. For example purposes, it is noted that the user identifier 121 is shown because the user selected to share their personal details via the privacy settings interface of FIG. 6B. Per data transformation means, the user identifier is also shown in a manner that avoids personal details such as last name, first name, etc; also affecting granularity of the information.

FIG. 6D shows a user interface 650 for a requester with a medium granularity level. The title section 631 shows that the user interface 630 is for a map application. The title section 651 also shows the map application from a city level perspective. Thus, the map 653 shows cities in this medium-zoom map view. The map 653 also has city indicators such as the city indicator 655 for the city Springfield. The user location indicator 637 shows a location and a name of the city where the user is located on the map 653. The user location indicator 657 also shows the user ID, which is USER121 given that the user chose to share the user's personal details as shown in FIG. 6B. The back button 659 goes back to a previous user interface, and the options button 661 may be selected to show various options.

Further, FIG. 6E shows a user interface 670 for a requester with a high granularity level. The title section 671 shows that the user interface 670 is for a map application, and also indicates that the map application shows at a street level. Therefore, the map 673 shows streets around the user's location zoomed-in map view. The map 673 also shows street names, such as the street name 675 for the $9^{th}$ street. The user location indicator 677 shows a location of the user on the map 673. In this user interface 670, the user location indicator 677 shows that the user is located at a cross section of Main Street and $9^{th}$ Street. The user location indicator 677 also shows the user ID, which is USER121, because the user chose to share the user's personal details as shown in FIG. 6B. The back button 679 goes back to a previous user interface, and the options button 681 may be selected to show various options.

Figure 7A:
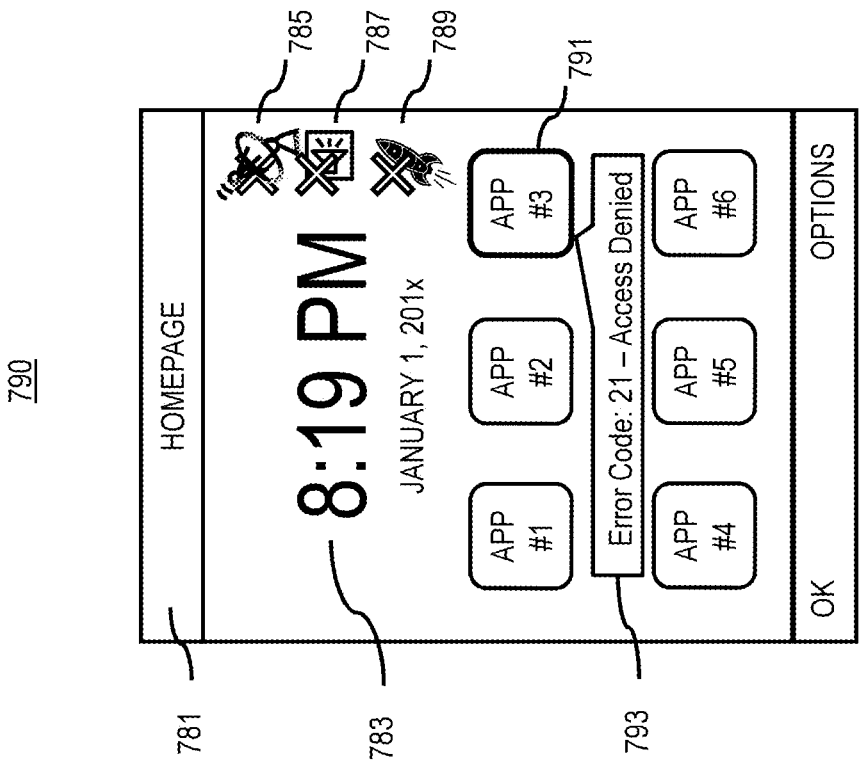
Figure 7B:
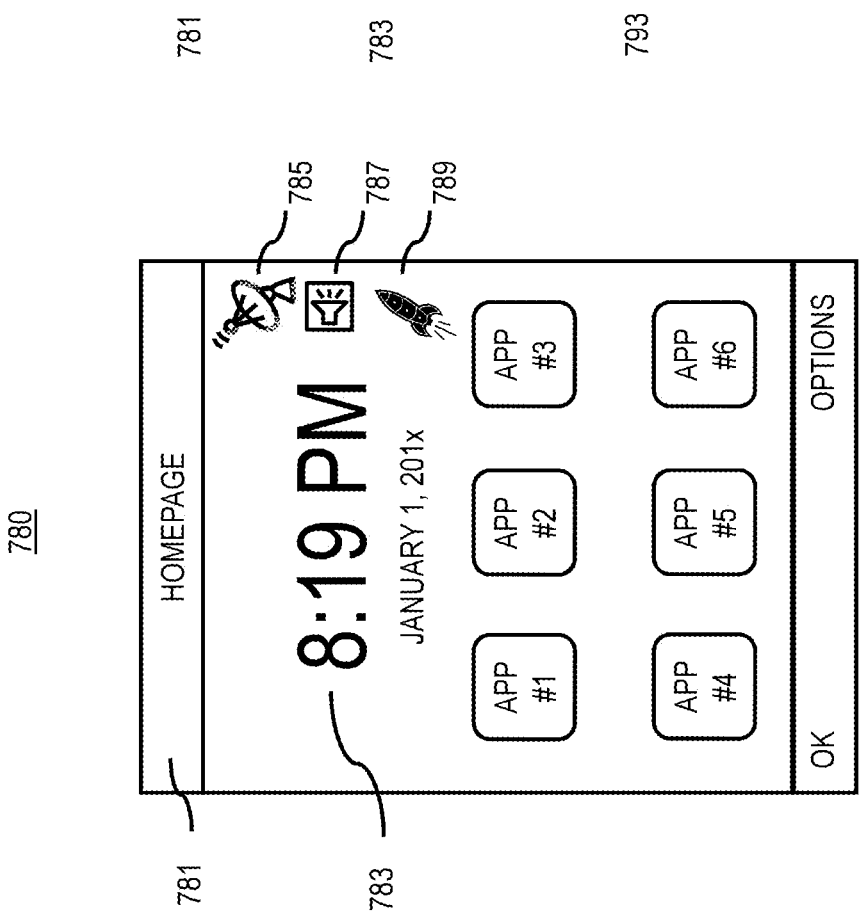

FIGS. 7A and 7B present a homepage (home screen) 780/790 the user device. A title section shows the user interface is for presenting the homepage 781. The homepage features various application selection buttons labeled APP #1 through APP #6, for enabling the user to initiate one or more applications. The homepage also presents current time and date information 783. The user may navigate to the homepage 780/790 during execution of the navigation tool as demonstrated with respect to FIGS. 6C-6E. By way of example, per the established privacy settings of FIG. 6B, the navigation tool may call out travel directions to the user as they engage the homepage 780. Resultantly, various indicators 785-789 are caused to be presented to the screen for indicating which resources of the device are being accessed. The icons are representative of the GPS sensor 785, speaker system 787 and accelerometer sensor 789, all of which are activated for acquiring local data.

In FIG. 7B, when the privacy settings are set to prevent access to local data (such as by the navigation tool), the indicators 785-789 are shown to be disabled. This is represented, for example, with an "X" or crossbar being indicated atop respective indicators 785-789. In another embodiment, the device may also present a message or prompt to the homepage interface 790 for presenting an error code 793. It is noted, by way of example, that the indicators 785-789 may be presented in response to an attempt by the user to initiate the navigation tool as represented by application selection button 791.

The exemplary techniques and systems presented herein enable privacy policies to be separately created, downloaded and used on demand, i.e., as policy objects. The policy objects can define the visual, haptic or other indicators to the user, even to the extent of supplying the graphics or user interface code required to generate a specific indication. As another advantage, the application calls the device resource/API but consults the privacy management module to determine if local data may be returned.

The processes described herein for maintaining user privacy information may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
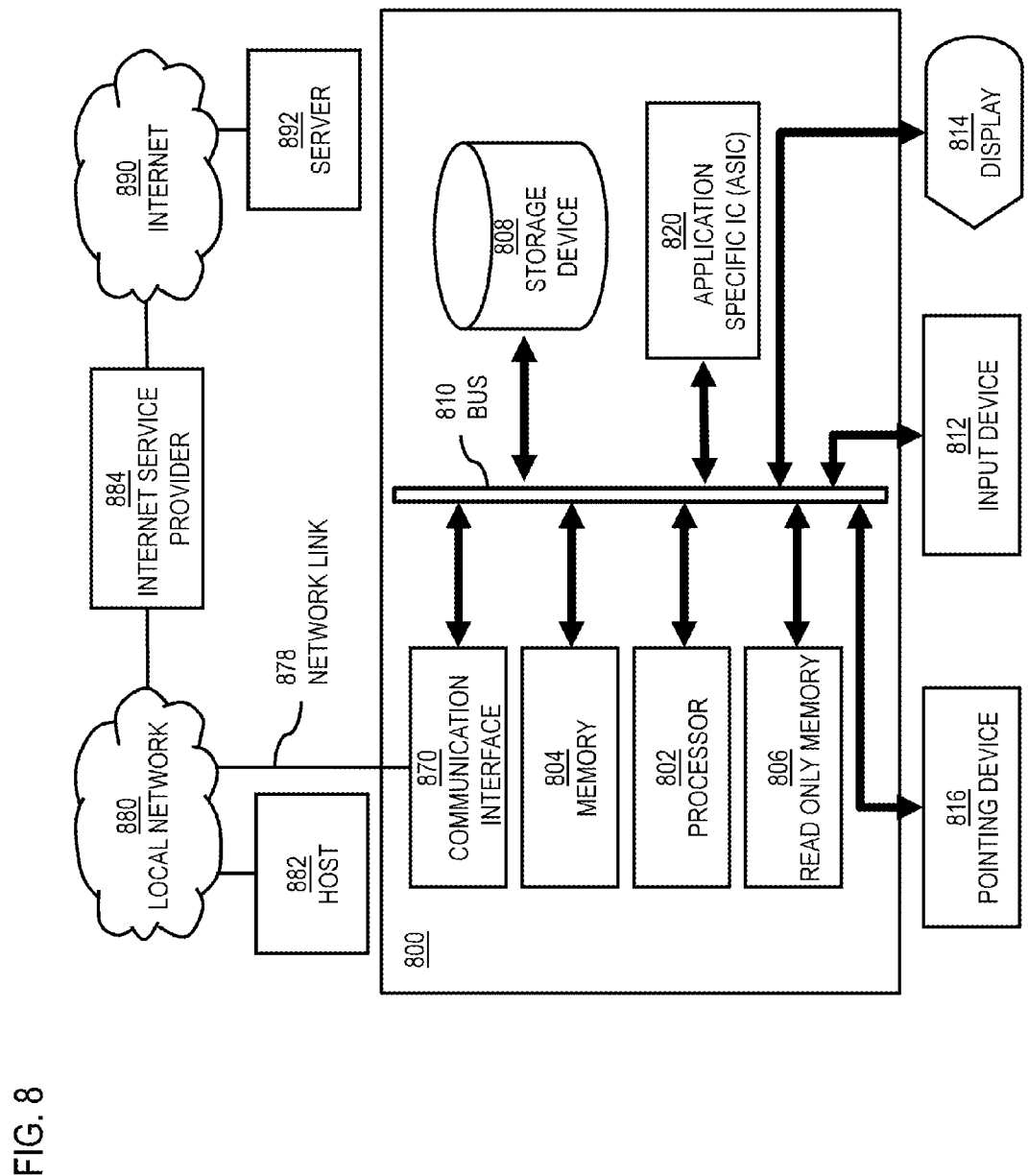
FIG. 8 is a diagram of hardware that can be used to implement an embodiment of the invention.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to maintain user privacy information as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of maintaining user privacy information.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to maintaining user privacy information. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or any other dynamic storage device, stores information including processor instructions for maintaining user privacy information. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for maintaining user privacy information, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 105 for maintaining user privacy information.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880 and communications interface 870. The received code may be executed by processor 802 as it is received, or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set or chip 900 upon which an embodiment of the invention may be implemented. Chip set 900 is programmed to maintain user privacy information as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of maintaining user privacy information associated with the availability of functions. Chip set or chip 900, or a portion thereof, constitutes a means for performing one or more steps of maintaining user privacy information.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to maintain user privacy information. The memory 905 also stores the data associated with or generated by the execution of the inventive steps.

Figure 10:
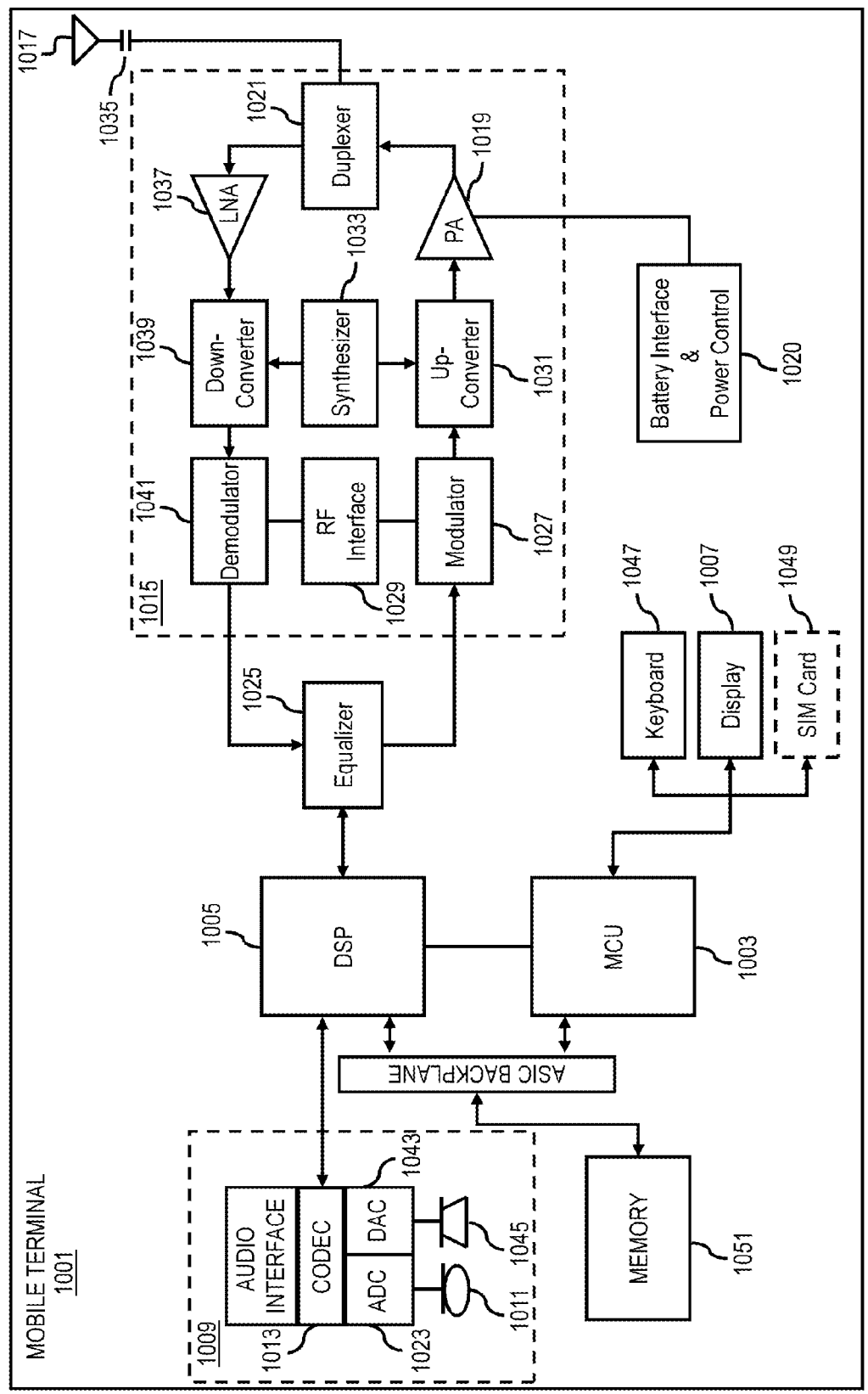
FIG. 10 is a diagram of a mobile terminal (e.g., handset) that can be used to implement an embodiment of the invention.

FIG. 10 is a diagram of exemplary components of a mobile terminal (e.g., handset) for communications, which is capable of operating in the system of FIG. 1, according to one embodiment. In some embodiments, mobile terminal 1001, or a portion thereof, constitutes a means for performing one or more steps of maintaining user privacy information. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of maintaining user privacy information. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to maintain user privacy information. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
  receiving, at a privacy platform, an alert that one or more applications has initiated a request for a sharing of local data stored at a device, wherein the privacy platform is independent of the one or more applications, and wherein the local data includes sensor data collected by one or more sensors of the device;
  in response to the alert and prior to the sharing of the local data by the one or more applications, determining one or more privacy profile objects specifying one or more privacy policies for with respect to the sharing of the local data, wherein the one or more privacy profile objects are independent of the one or more applications and are created by a trusted external organization, the one or more privacy profile objects being configured for the user to selectively grant the sharing of the local data by the one or more applications, and wherein the trusted external organization is independent from one or more service providers associated with the one or more applications;
  initiating an enforcement of the one or more privacy policies by applying at least one transformation of the local data to generate transformed local data that satisfies the one or more privacy policies, wherein the enforcement of the one or more privacy policies further comprises generating a prompt requesting an approval from a user of the device for granting the sharing of the local data by the one or more applications; and
  fulfilling the request for the sharing of the local data by granting the one or more applications a sharing right for the transformed local data in place of the local data.

2. The method of claim 1, wherein the enforcement of the one or more privacy policies further comprises presenting an indicator representative of the one or more privacy profile objects in a user interface of the device.

3. The method of claim 1, wherein the enforcement of the one or more privacy policies further comprises denying the sharing of the local data by the one or more applications.

4. The method of claim 1, further comprising:
  processing the one or more privacy profile objects to determine one or more resources related to the enforcement of the one or more privacy policies.

5. The method of claim 1, wherein the at least one transformation includes transforming the local data from a first level of data granularity to a second level of data granularity of the transformed local data.

6. The method of claim 5, wherein the first level of data granularity and the second level of data granularity are previously stored in at least one source of the local data.

7. The method of claim 1, wherein the at least one transformation of the local data includes decreasing level of accuracy of the local data, replacing partial of the local data with some other data, or/and adjusting granularity level of the local data.

8. The method of claim 1, wherein the privacy policy objects are remotely programmable.

9. An apparatus comprising:
  at least one processor; and
  at least one memory including computer program code for one or more programs, the at least one memory and the computer program code configured to, with the at least one processor, cause the apparatus to perform at least the following,
    receive, at a privacy platform, an alert that one or more applications has initiated a request for a sharing of local data stored at a device, wherein the privacy platform is independent of the one or more applications, and wherein the local data includes sensor data collected by one or more sensors of the device;
    in response to the alert and prior to the sharing of the local data by the one or more applications, determine one or more privacy profile objects specifying one or more privacy policies for with respect to the sharing of the local data, wherein the one or more privacy profile objects are independent of the one or more applications and are created by a trusted external organization, the one or more privacy profile objects being configured for the user to selectively grant the sharing of the local data by the one or more applications, and wherein the trusted external organization is independent from one or more service providers associated with the one or more applications;
    initiate an enforcement of the one or more privacy policies by applying at least one transformation of the local data to generate transformed local data that satisfies the one or more privacy policies, wherein the enforcement of the one or more privacy policies further comprises generating a prompt requesting an approval from a user of the device for granting the sharing of the local data by the one or more applications; and
    fulfill the request for the sharing of the local data by granting the one or more applications a sharing right for the transformed local data in place of the local data.

10. The apparatus of claim 9, wherein the enforcement of the one or more privacy policies further comprises presenting an indicator representative of the one or more privacy profile objects in a user interface of the device.

11. The apparatus of claim 9, wherein the enforcement of the one or more privacy policies further comprises denying the sharing of the local data by the one or more applications.

12. The apparatus of claim 9, wherein the apparatus is further caused to:
  process the one or more privacy profile objects to determine one or more resources related to the enforcement of the one or more privacy policies.

13. The apparatus of claim 9, wherein the at least one transformation includes transforming the local data from a first level of data granularity to a second level of data granularity of the transformed local data.

14. The apparatus of claim 13, wherein the first level of data granularity and the second level of data granularity are previously stored in at least one source of the local data.

15. The apparatus of claim 9, wherein the at least one transformation of the local data includes decreasing level of accuracy of the local data, replacing partial of the local data with some other data, or/and adjusting granularity level of the local data.

16. The apparatus of claim 9, wherein the privacy policy objects are remotely programmable.

17. A non-transitory computer-readable storage medium carrying one or more sequences of one or more instructions which, when executed by one or more processors, cause an apparatus to perform:

receiving, at a privacy platform, an alert that one or more applications has initiated a request for a sharing of local data stored at a device, wherein the privacy platform is independent of the one or more applications, and wherein the local data includes sensor data collected by one or more sensors of the device;

in response to the alert and prior to the sharing of the local data by the one or more applications, determining one or more privacy profile objects specifying one or more privacy policies for with respect to the sharing of the local data, wherein the one or more privacy profile objects are independent of the one or more applications and are created by a trusted external organization, the one or more privacy profile objects being configured for the user to selectively grant the sharing of the local data by the one or more applications, and wherein the trusted external organization is independent from one or more service providers associated with the one or more applications;

initiating an enforcement of the one or more privacy policies by applying at least one transformation of the local data to generate transformed local data that satisfies the one or more privacy policies, wherein the enforcement of the one or more privacy policies further comprises generating a prompt requesting an approval from a user of the device for granting the sharing of the local data by the one or more applications; and fulfilling the request for the sharing of the local data by granting the one or more applications a sharing right for the transformed local data in place of the local data.

18. The non-transitory computer-readable storage medium of claim 17, wherein the enforcement of the one or more privacy policies further comprises presenting an indicator representative of the one or more privacy profile objects in a user interface of the device.

19. The non-transitory computer-readable storage medium of claim 17, wherein the enforcement of the one or more privacy policies further comprises denying the sharing of the local data by the one or more applications.

20. The non-transitory computer-readable storage medium of claim 17, wherein the at least one transformation of the local data includes decreasing level of accuracy of the local data, replacing partial of the local data with some other data, or/and adjusting granularity level of the local data.

* * * * *